US012679012B2

(12) United States Patent
Haut

(10) Patent No.: US 12,679,012 B2
(45) Date of Patent: Jul. 14, 2026

(54) METHOD FOR PRODUCING AN OPTICAL LENS AND OPTICAL LENS PRODUCED BY SAID METHOD

(71) Applicant: HELLA GMBH & CO. KGAA, Lippstadt (DE)

(72) Inventor: Dietmar Haut, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 1612 days.

(21) Appl. No.: 17/099,644

(22) Filed: Nov. 16, 2020

(65) Prior Publication Data

US 2021/0069952 A1     Mar. 11, 2021

Related U.S. Application Data

(63) Continuation of application No. PCT/EP2019/061637, filed on May 7, 2019.

(30) Foreign Application Priority Data

May 15, 2018    (DE) ..................... 10 2018 111 545.8

(51) Int. Cl.
 *B29C 45/16*        (2006.01)
 *B29D 11/00*        (2006.01)
 *G02B 3/00*         (2006.01)

(52) U.S. Cl.
 CPC .... *B29C 45/1675* (2013.01); *B29D 11/00009* (2013.01); *B29D 11/0048* (2013.01);
 (Continued)

(58) Field of Classification Search
 CPC .......... B29D 11/00009; B29D 11/0048; B29D 11/00326; B29D 11/0073; G02B 2003/0093; G02B 3/00; B29C 45/1675
 See application file for complete search history.

(56) References Cited

U.S. PATENT DOCUMENTS

| | | | |
|---|---|---|---|
| 4,682,943 A | | 7/1987 | Schomblond |
| 4,999,142 A | * | 3/1991 | Fukushima ............ B29D 11/00 264/1.32 |

(Continued)

FOREIGN PATENT DOCUMENTS

| | | |
|---|---|---|
| DE | 100 48 861 A1 | 4/2002 |
| DE | 10 2005 053 979 A1 | 5/2007 |

(Continued)

OTHER PUBLICATIONS

English translation of Jp 20060662359A supplied by Espacenet (Year: 2023).*

*Primary Examiner* — Abbas Rashid
*Assistant Examiner* — Elisa H Vera
(74) *Attorney, Agent, or Firm* — Muncy, Geissler, Olds & Lowe, P.C.

(57)    ABSTRACT

A method for producing an optical lens using an injection mold and to an optical lens produced by the method, wherein, in the method, in a first injection molding step, a first partial body is pre-injection molded in a first cavity and subsequently, in an second injection molding step, in a second cavity, a second partial body is injection molded onto the first partial body, wherein the first partial body and the second partial body are injection molded arranged in front of one another along a thickness axis of the optical lens. The method provides that the first partial body is injection molded with a thickness proportion (a) of 60% to 70% of the total thickness of the optical lens, and wherein the second partial body is injection molded with the remaining thickness proportion (b).

7 Claims, 2 Drawing Sheets

(52) U.S. Cl.
CPC .......... *G02B 3/00* (2013.01); *B29D 11/00326*
(2013.01); *G02B 2003/0093* (2013.01)

(56) References Cited

U.S. PATENT DOCUMENTS

| | | | |
|---|---|---|---|
| 10,183,429 | B2 | 1/2019 | Giessauf et al. |
| 2003/0164564 | A1 | 9/2003 | Klotz |
| 2007/0036878 | A1* | 2/2007 | Goodenough ..... B29D 11/0049 |
| | | | 425/808 |
| 2013/0148363 | A1* | 6/2013 | Choquet ................. B29C 45/16 |
| | | | 362/335 |
| 2014/0246796 | A1* | 9/2014 | Tseng ................... B29C 45/372 |
| | | | 425/542 |
| 2014/0332991 | A1* | 11/2014 | Giessauf ............ B29C 45/7207 |
| | | | 264/1.7 |
| 2016/0082629 | A1 | 3/2016 | Modi |

FOREIGN PATENT DOCUMENTS

| | | | |
|---|---|---|---|
| DE | 10 2007 021 679 | A1 | 11/2008 |
| DE | 10 2012 205 196 | A1 | 10/2013 |
| DE | 10 2014 004 766 | A1 | 10/2014 |
| DE | 10 2015 001 609 | A1 | 8/2016 |
| JP | H 08-187793 | A | 7/1996 |
| JP | 2006-062359 | A | 3/2006 |

* cited by examiner

METHOD FOR PRODUCING AN OPTICAL LENS AND OPTICAL LENS PRODUCED BY SAID METHOD

This nonprovisional application is a continuation of International Application No. PCT/EP2019/061637, which was filed on May 7, 2019, and which claims priority to German Patent Application No. 10 2018 111 545.8, which was filed in Germany on May 15, 2018, and which are both herein incorporated by reference.

BACKGROUND OF THE INVENTION

Field of the Invention

The present invention relates to a method for producing an optical lens with an injection mold and an optical lens produced by said method, wherein, in the method, in a first injection molding step, a first partial body is pre-injected in a first cavity and subsequently, in a second injection molding step, in a second cavity, a second partial body is injection molded onto the first partial body, wherein the first partial body and the second partial body are injection molded arranged in front of one another along a thickness axis of the lens.

Description of the Background Art

Especially thick-walled optical lenses are produced with at least two injection molding steps, because only then can the optical quality of the lenses be achieved in accordance with today's requirements. In particular, a cavity for injection molding the lens body must not be selected as too large, because inhomogeneities in the optical material of the lens and shape deviations are the result.

A method for producing an optical lens is known from DE102014004766 A1, which corresponds to U.S. Pat. No. 10,183,429, wherein at least two injection molding stations an injection molding material is cast by at least two injection molding processes, wherein a pre-molded part, produced in one of the at least two injection molding processes, is cooled in a cooling station between the at least two injection molding processes. In the second injection molding step, the pre-molded part is overmolded with the injection molding material from both sides.

DE102012205196 A1 discloses a method for injection molding an optical lens with an injection molding machine comprising a plasticizing unit with a plasticizing screw and an injection molding tool supplied by it, wherein a pair of mold cavities in the injection molding tool, of which a first cavity is intended for a pre-molded part and a second cavity for a post-molded part to be injection molded onto a pre-molded part.

If microstructures are to be produced on at least one of the surfaces of the lens in the injection molding, this cannot be done without a hydraulically actuated compression die that movably delimits the second cavity, if the pre-molded part is only overmolded on the edges. A holding pressure phase after the injection molding of the second injection molding material cannot be used in this case, because the smaller wall thickness of the post-injection molding part causes the second injection molded material to solidify too quickly.

Further, DE 100 48 861 A1, which corresponds to US 2003/0164564, proposes designing the cavity for the injection molding of an optical lens in a variable manner, and after the plasticized plastic material has been injected into the cavity, the plasticized plastic material continues to be introduced while the cavity is simultaneously enlarged, for example, by an opening movement of a ram that movably defines the cavity. With a compression phase between the injection and the beginning of the enlargement of the cavity, deviations in the shape of the lens body can be avoided and, for example, microstructures that are to be created on the surface of the optical lens can be made possible by the compression step, for example, by a closing movement of the ram. Disadvantageously, the die technique for the formation of variable cavities is expensive and the dies usually have to be heated up more, which increases cycle times again.

SUMMARY OF THE INVENTION

It is therefore an object of the present invention to provide a method for producing an optical lens with an injection mold, in which the mold technology is to be carried out as simply as possible, and wherein the shortest possible cycle time for the production of optical lenses is to be achieved. In particular, it is to be possible to produce a thick-walled optical lens with only two injection molding steps, and the optical lens produced is to have good dimensional stability and no other visible marks on the surface.

In an exemplary embodiment, for the execution of the method, the first partial body is injection molded with a thickness proportion of 60% to 70% of the total thickness of the optical lens and wherein the second partial body is injection molded with the remaining thickness proportion.

The core idea of the invention is the production of an optical lens with only two injection molding steps using a division of the injected thickness proportions, which are designed so that an optimally short cycle time can be achieved. An optimal cycle time can be achieved with a first partial body, which in the thickness axis of the lens already forms about two thirds of the thickness of the lens, because when the injection mold is opened, the first partial body remains in contact with a first mold part of the injection mold and can cool down accordingly, whereas a second mold part of the injection mold has an exchangeable core insert which forms the differential cavity for injection molding the second partial body. If the second partial body is injection molded, it is already small enough so that the plasticized plastic compound can be injected into the cavity without the formation of a flow body. For this purpose, the second partial body has a proportional thickness of, for example, about a third of the total thickness of the optical lens, wherein with a subsequent cooling, the cycle time can likewise be reduced again, because the comparatively small thickness of the second partial body can also be cooled more quickly. The result is a total cycle time for carrying out the method for producing an optical lens with a minimal duration, and even thicker optical lenses, for example, with a thickness of about 25 mm, can be produced in only two injection molding steps.

The first partial body is injection molded with particular advantage with a thickness proportion of 64% to 68% of the total thickness of the optical lens, in particular with a thickness proportion of two thirds of the total thickness. Accordingly, the second partial body is injection molded with a remaining thickness proportion of one third.

The change in the cavity of the injection mold from the first cavity to the second cavity can be produced with a further advantage by means of an exchangeable core insert. The first core insert differs from the second core insert in that the first core insert creates a smaller first cavity, which in particular forms a meniscus shape in which the core insert is curved inwardly into the cavity in the direction of the opposite cavity wall. If the first core insert is exchanged for the second core insert, the second core insert can delimit the cavity with a planar surface so that the second partial body does not have an approximately meniscus-shaped cross section but a plano-convex-shaped cross section.

With a further advantage, a partial section of the cavity is formed with a molding surface having a microstructure which is reproduced on the surface of the first partial body during injection molding. In order to avoid the use of a hydraulic hob, in particular with the use the core insert in the injection mold, it can be provided with a further advantage that after the first injection molding step has taken place, a holding pressure of the plasticized plastic compound is maintained for a time in the first cavity. By maintaining a holding pressure, in particular while maintaining the plasticized state of the plastic compound, and with a preferably oversized sprue, for example, on the order of 35 to 45 mm$^2$, a microstructure in the mold surface of the injection mold can be reproduced on the outer surface of the first partial body to such an extent that hydraulic closing, for example, of a hob, is no longer necessary. In particular, this further simplifies the structural design of the injection mold.

The temperature of the injection mold for carrying out the method of the invention at least in the area of the sections forming the cavities at least during the injection molding steps can be set to a value of 95° C. to 105° C., in particular to a value of 100° C. The lower mold temperature required achieves the particular advantage that so-called ceramic heating elements, which usually heat a mold to around 160° C., are no longer necessary. With the proposed mold geometry, there is in particular no solidification of the injected plasticized plastic compound on the surfaces of the injection mold, in particular on the surfaces of the core insert.

A sprue for the execution of the first injection molding step is arranged relative to the first core insert such that the injected plasticized plastic compound to form the first partial body flows against the first inwardly curved core insert, so that a flow body is formed with the first partial body. An additional flow body, which can be temporarily inserted into the cavity if necessary, is thus superfluous.

The invention is further directed to an optical lens which is produced using the method presented above. The optical lens is particularly characterized in that the body of the optical lens is formed by a first partial body with a thickness proportion of the total thickness of the optical lens from 60% to 70% and in particular from 64% to 68% and by a second partial body with the remaining thickness proportion.

The body of the optical lens has, for example, a thickness of 20 mm to 35 mm, in particular a thickness of 23 mm to 26 mm, particularly preferably a thickness of 25 mm, wherein in particular the body of the optical lens has a diameter with a value or a main axis, running perpendicular to a thickness axis, with a length of 50 mm to 70 mm and preferably with a length of 56 mm. In particular, the optical lens is formed by a surface with a microstructure. The surface in this case is the surface that is formed on the first partial body in the first injection molding step and that comes into contact with a first mold part of the injection mold. For this purpose, the first mold part of the injection mold has a molding surface which corresponds to the negative of the surface on the optical lens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
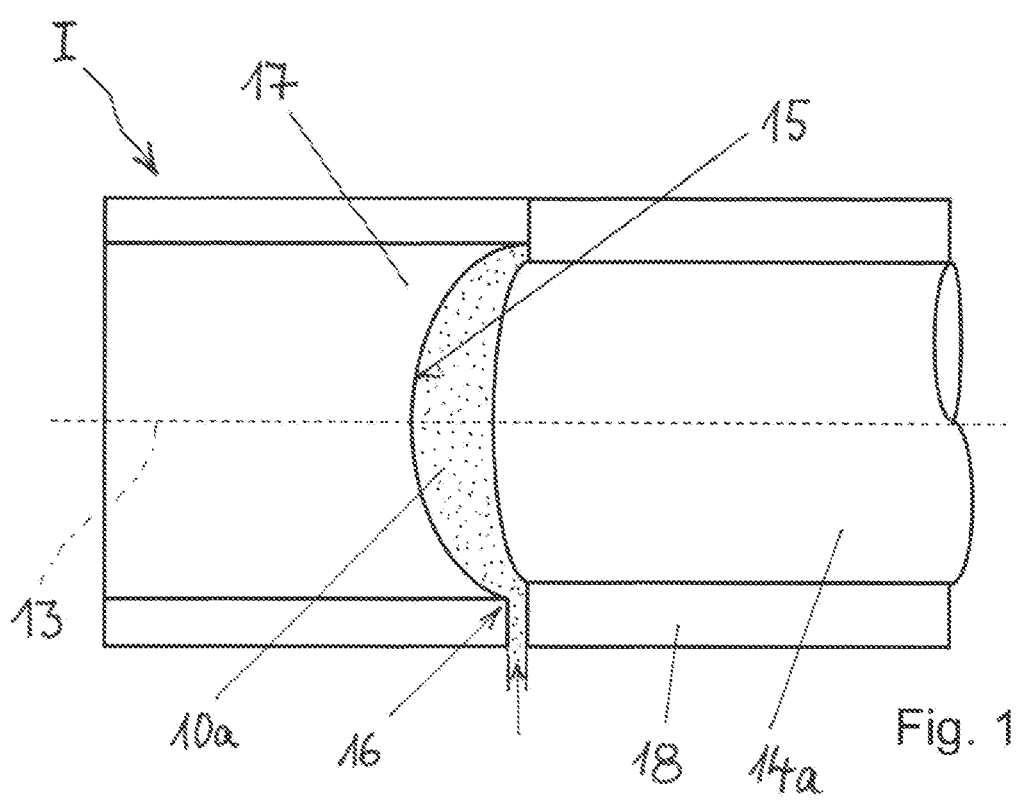
FIG. 1 shows an injection mold for producing an optical lens in a first injection molding step.

FIG. 1 shows a schematic view of an injection mold for performing a first injection molding step I by means of a first cavity 10a, which is produced by the mutual closing of a first mold part 17 of the injection mold and a second mold part 18 of the injection mold. Second mold part 18 of the injection mold comprises a first core insert 14a which is exchangeably received in second mold part 18 of the injection mold. The two mold parts 17 and 18 with core insert 14a are movable relative to one another in an axis that corresponds to thickness axis 13 of the lens to be produced.

Figure 3:
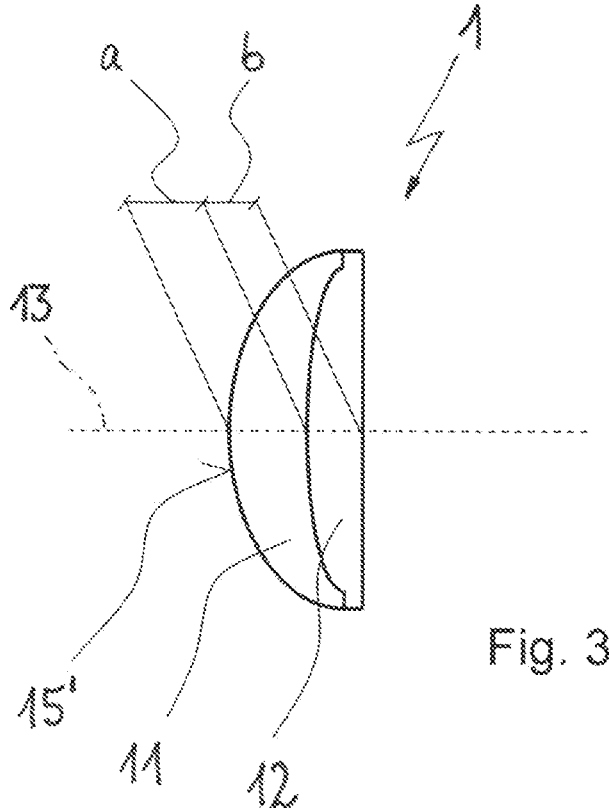
FIG. 3 shows an optical lens produced using the injection molding method of the invention.

Plasticized plastic compound can be injected into first cavity 10a through a sprue 16, so that a first partial body 11 of optical lens 1 can be formed; see FIG. 3 in this regard.

First mold part 17 of the injection mold has a molding surface 15, and molding surface 15 delimits first cavity 10a on a side opposite core insert 14a. After a sufficient cooling time, mold parts 17 and 18 can be moved apart again, wherein the produced first partial body 11 of optical lens 1 remains in arrangement on first mold part 17.

Core insert 14a has a curvature protruding into cavity 10a, so that first cavity 10a is configured approximately in the shape of a meniscus, wherein when the plasticized plastic compound flows in through sprue 16, the plastic compound flows laterally against core insert 14a, so that core insert 14a also serves as a flow body for the plastic compound to enable a controlled inflow of the plastic compound into first cavity 10a.

Figure 2:
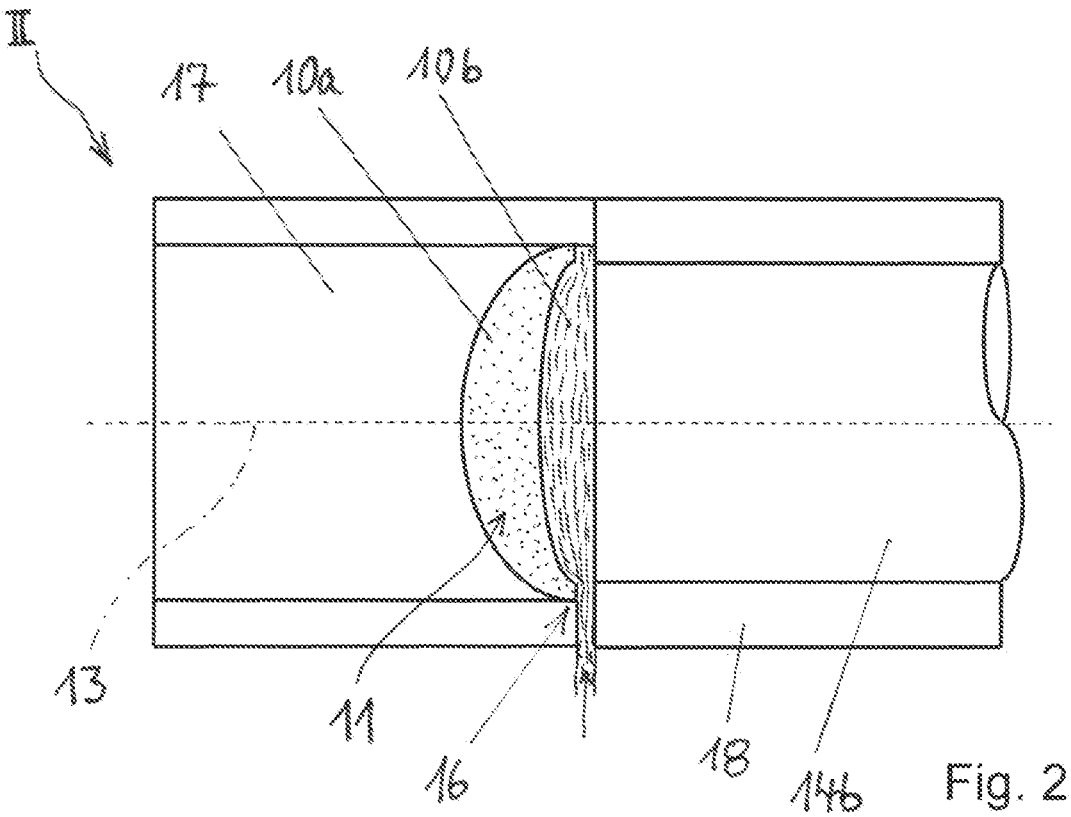
FIG. 2 shows the injection mold according to FIG. 1 in a second injection molding step.

FIG. 2 shows the injection mold with mold parts 17 and 18 for performing the second injection molding step II. Core insert 14b with a planar surface delimiting cavity 10b is inserted in second mold part 18 of the injection mold in order to form second cavity 10b in front of first cavity 10a, which is already filled with first partial body 11. If the plasticized plastic compound is again injected through a further sprue 16, second cavity 10b fills and the plasticized plastic compound forms a surface connection to the surface of first partial body 11.

After a cooling time and solidification of the plasticized plastic compound in second cavity 10b, mold parts 17 and 18 with core insert 14b can be moved apart again along thickness axis 13.

First cavity 10a has a thickness in thickness axis 13 which corresponds to approximately two thirds of the total thickness of the lens, so that the thickness of second cavity 10b has approximately one third of the total thickness of the lens along thickness axis 13.

FIG. 3 shows the produced optical lens 1 in a simplified side view, and optical lens 1 has a first partial body 11, produced in the injection molding in first cavity 10*a*, and optical lens 1 has a second partial body 12 which is produced in the injection molding in second cavity 10*b*. The thickness proportion 'a' of first partial body 11 corresponds to approximately two thirds of the total thickness of lens 1 and the thickness proportion 'b' of second partial body 12 has a value that corresponds to approximately one third of the total thickness of lens 1. On the outwardly curved outer surface of optical lens 1 in the area of first partial body 11, this surface 15' has a microstructure that was formed from a molding surface 15 in first mold part 17 of the injection mold.

The invention is not limited in its implementation to the preferred exemplary embodiment described above. Rather, a number of variants are conceivable which make use of the described solution in fundamentally different embodiments as well. All features and/or advantages emerging from the claims, the description, or the drawings, including structural details, spatial arrangements, and method steps, can be essential to the invention both alone and in the most diverse combinations.

What is claimed is:

1. A method for producing an optical lens with an injection mold, the method comprising:

pre-injecting, in a first injection molding step, a first partial body in a first cavity; and injection molding, in a second injection molding step, in a second cavity, a second partial body onto the first partial body, wherein the first partial body and the second partial body are injection molded so as to be arranged in front of one another along a thickness axis of the optical lens, wherein the first partial body is injection molded, such that a thickness of the first partial body along the thickness axis is 60% to 70% of a total thickness of the optical lens along the thickness axis and the second partial body is injection molded, such that a thickness of the second partial body along the thickness axis is a remaining thickness proportion of the total thickness, wherein the injection mold includes a first mold part and a second mold part that are movable with respect to one another along the thickness axis, wherein a change from the first cavity to the second cavity occurs by an exchangeable core insert, wherein the exchangeable core insert includes a first core insert that is provided inside the second mold part during the first injection molding step and a second core insert that is provided inside the second mold part during the second injection molding step, and wherein the first core insert is removed from the second mold part after the first injection molding step and prior to inserting the second core insert into the second mold part.

2. The method according to claim 1, wherein the first partial body is injection molded with a thickness along the thickness axis of 64% to 68% of the total thickness of the optical lens along the thickness axis.

3. The method according to claim 1, wherein a partial section of the first cavity is formed with a molding surface having a microstructure which is reproduced on a surface of the first partial body during injection molding.

4. The method according to claim 3, wherein the molding surface having the microstructure is provided on the first mold part.

5. The method according to claim 1, wherein, after the first injection molding step has taken place, a holding pressure of a plasticized plastic compound that was injected into the first cavity during the first injection molding step is maintained for a period of time in the first cavity.

6. The method according to claim 1, wherein, at least during the first injection molding step and the second injection molding step, a temperature of the injection mold at least in an area of sections of the injection mold forming the first cavity and the second cavity is set to a value of 95° C. to 105° C.

7. The method according to claim 1, wherein a sprue is arranged relative to the first core insert such that an injected plasticized plastic compound, that forms the first partial body, flows against the first core insert so that a flow body is formed with the first partial body.

* * * * *